March 23, 1954
A. N. SPANEL
2,672,628
UTILITY DEVICE FOR INFANTS
Filed Oct. 30, 1947
4 Sheets-Sheet 1
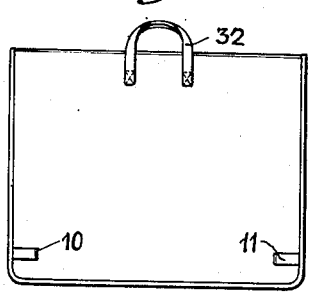
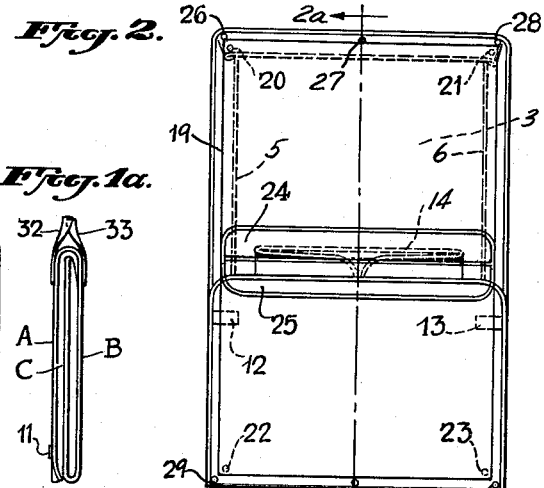
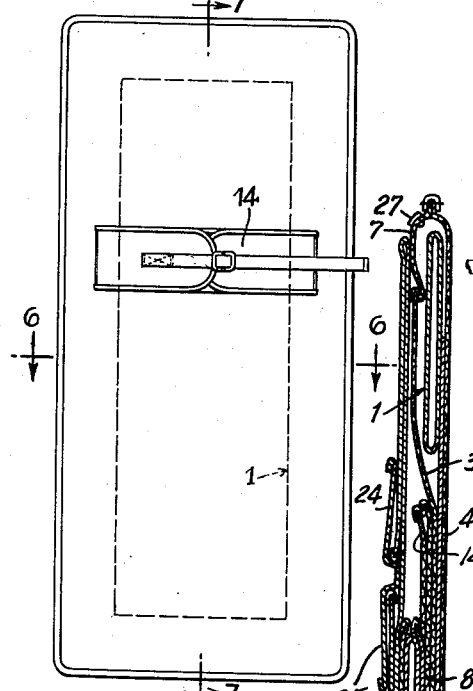
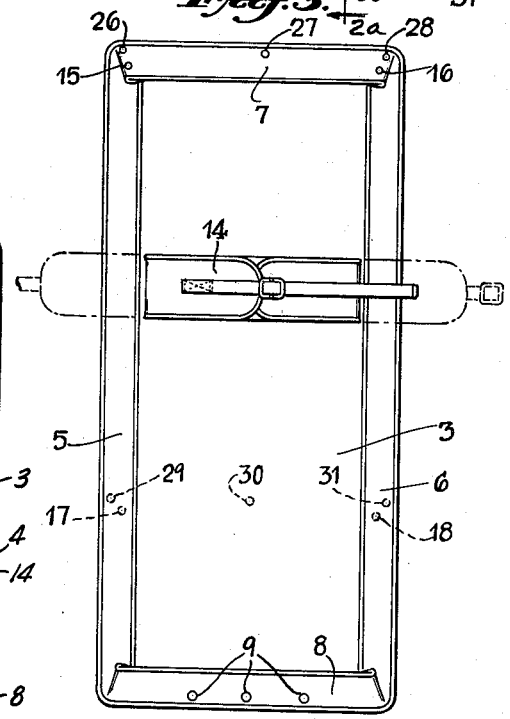
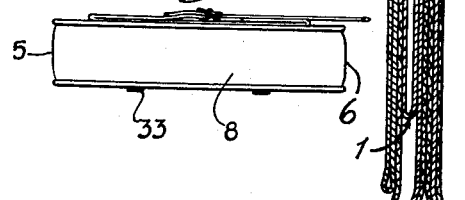
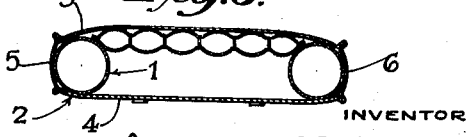
INVENTOR
ABRAHAM N. SPANEL.
BY Ward Crosby & Neal
his ATTORNEYS.

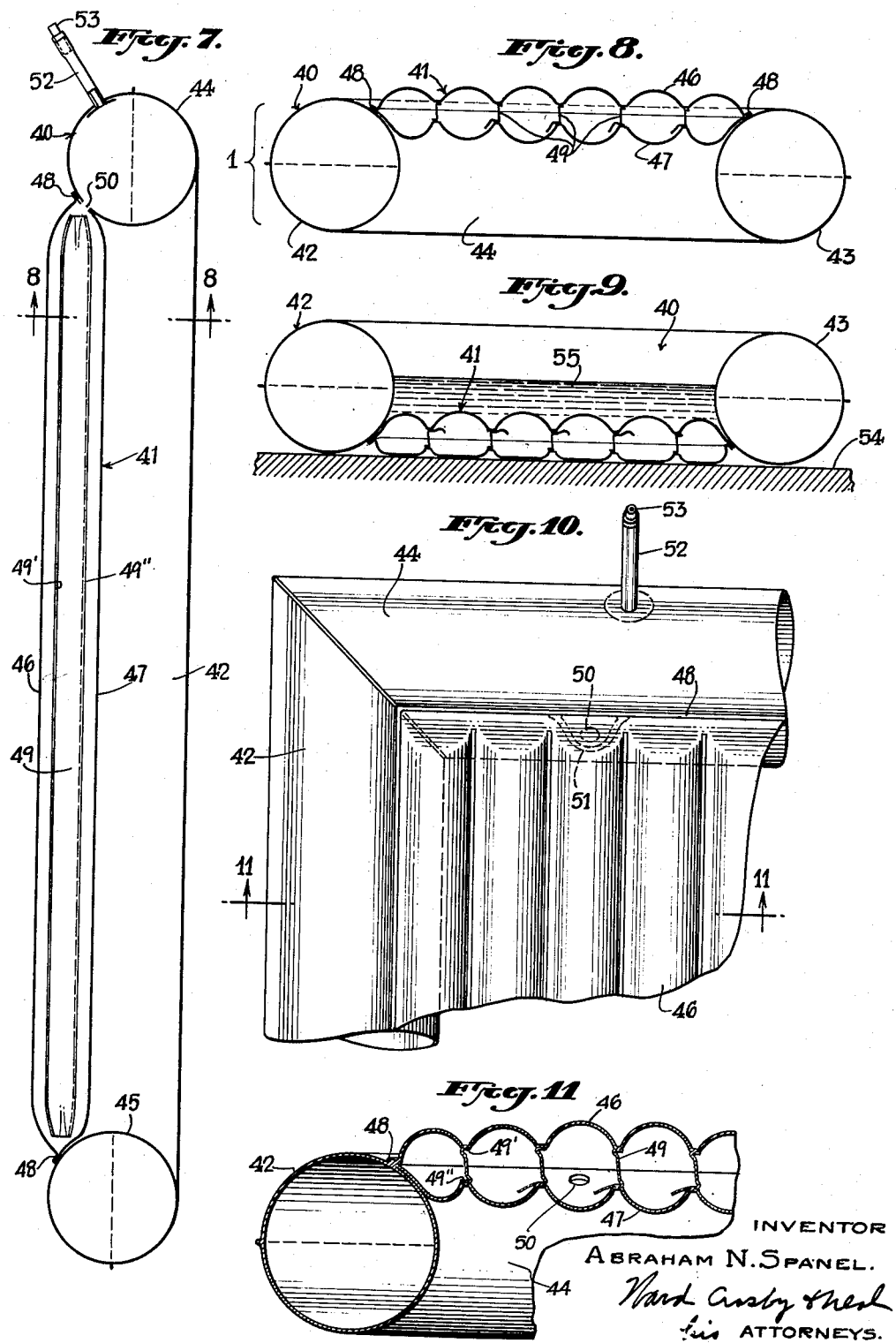

March 23, 1954
A. N. SPANEL
2,672,628
UTILITY DEVICE FOR INFANTS
Filed Oct. 30, 1947
4 Sheets-Sheet 3
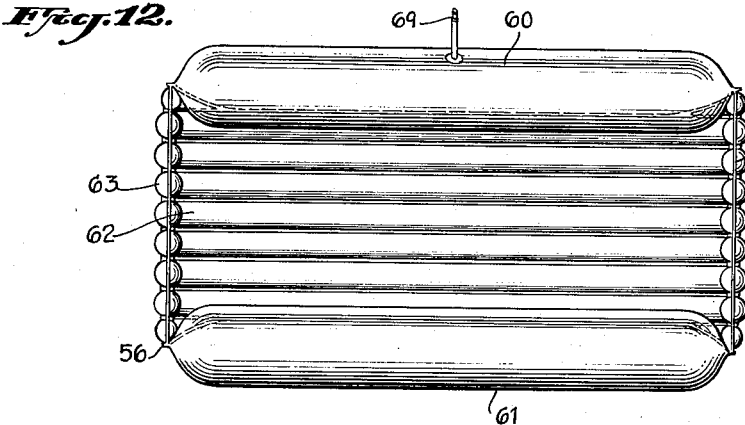
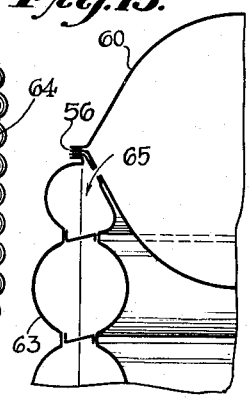
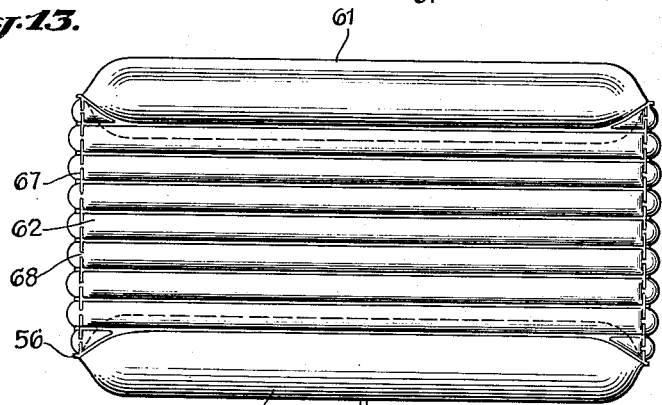
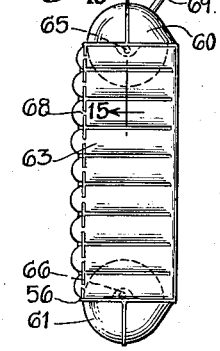
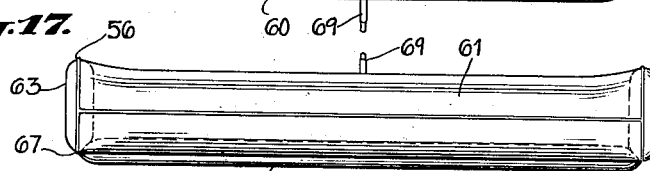
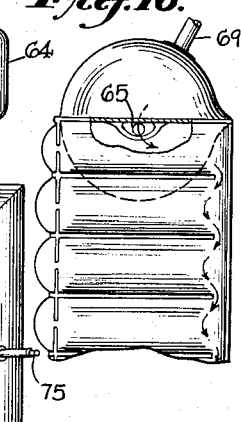
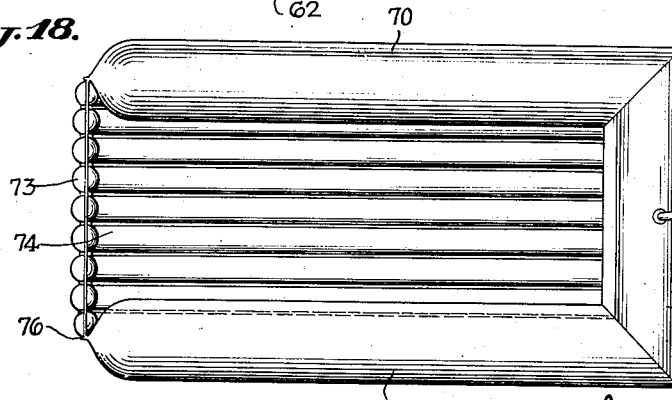
INVENTOR.
BY ABRAHAM N. SPANEL.
*Ward Crosby Field*
*his* ATTORNEYS.

March 23, 1954 — A. N. SPANEL — 2,672,628
UTILITY DEVICE FOR INFANTS
Filed Oct. 30, 1947 — 4 Sheets-Sheet 4
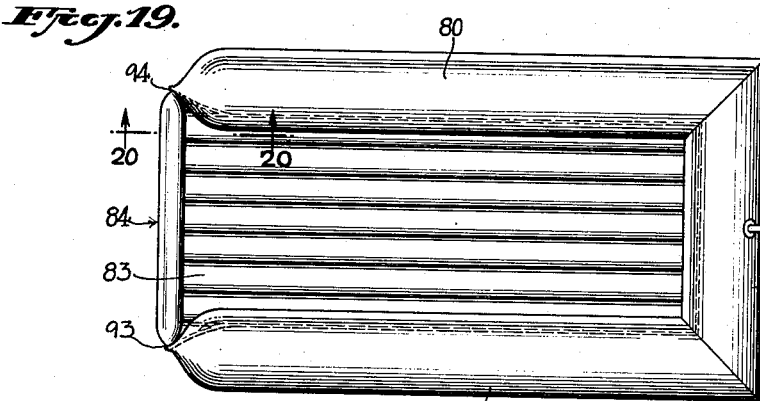
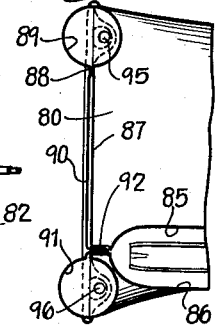
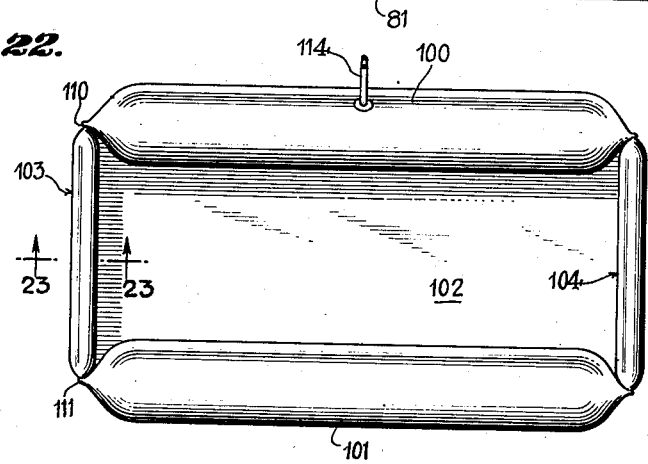
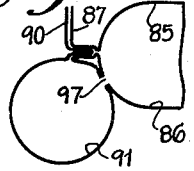
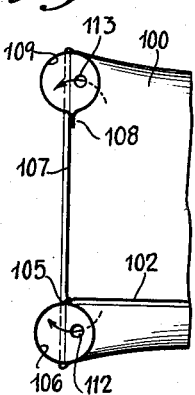
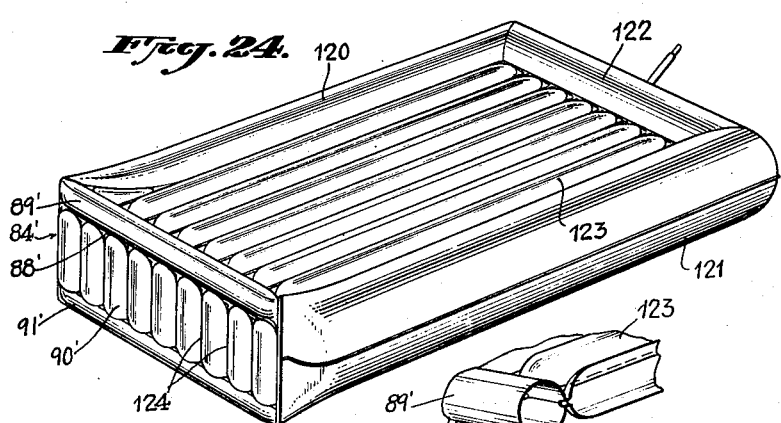
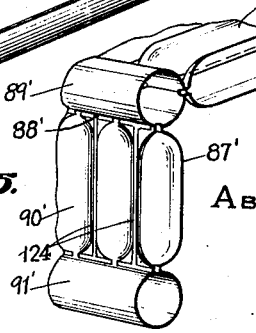
INVENTOR.
ABRAHAM N. SPANEL.
BY
his ATTORNEYS.

Patented Mar. 23, 1954

2,672,628

UNITED STATES PATENT OFFICE 2,672,628

UTILITY DEVICE FOR INFANTS

Abraham N. Spanel, Princeton, N. J.

Application October 30, 1947, Serial No. 783,112

4 Claims. (Cl. 5—348)

This invention relates to a utility device for infants and more especially to a device utilizable as a bed, for receiving and holding an infant in reclining or sitting position or for carrying said infant, and a bath. The device is adapted to be folded or rolled into a compact package or bundle which may be readily carried; and in the embodiment of the invention herein illustrated the device comprises a detachable envelope container serving jointly to hold the device in folded position and to be enclosed within the folds for accommodating an infant's wearing apparel.

An object of the invention is to provide a lightweight device which may be utilized for supporting or carrying the infant and as a receptacle for holding water in which to bathe the infant.

Another object of the invention is to provide a device utilizable as a bed and bath and readily collapsible and foldable into a light, compact package or bundle which may be readily carried in a woman's handbag.

The invention consists in the novel features, arrangements and combination of parts embodied by way of example in the device hereinafter described as illustrating a preferred form of the invention, and the invention will be more particularly pointed out in the appended claims.

Further objects, features and advantages of the invention will more clearly appear from the detailed description given below taken in connection with the accompanying drawings, which form a part of the specification.

Referring to the drawings:

Fig. 1 is a side elevational view of a preferred embodiment of the invention shown in collapsed and folded condition for carrying;

Fig. 1a is an end elevational view of the device as shown in Fig. 1;

Figs. 1b and 1c are side and end views respectively showing the device of Figs. 1 and 1a rolled into a compact bundle for insertion in a handbag;

Fig. 2 is a plan view of the device in partially folded condition;

Fig. 2a is a longitudinal sectional view of the device in its folded condition indicated in Fig. 2;

Fig. 3 is a plan view of said device, with the lining envelope receptacle removed, showing the device extended and ready for inflation;

Fig. 4 is a view similar to Fig. 3 but showing the device inflated;

Fig. 5 is an end view of the device as shown in Fig. 4;

Fig. 6 is a cross-sectional view taken at 6—6 of Fig. 4;

Fig. 7 is a longitudinal cross-sectional view taken at 7—7 of Fig. 4 with the casing removed to show the internal arrangement of the inflatable unit;

Fig. 8 is a transverse cross-sectional view taken at 8—8 of Fig. 7, with the inflatable unit positioned for use as a bed;

Fig. 9 is a view similar to Fig. 8, but with the inflatable unit inverted for use as a bath;

Fig. 10 is a segmented top plan view of the device as positioned in Figs. 7 and 8;

Fig. 11 is a transverse cross-sectional view taken at 11—11 of Fig. 10 and showing further details;

Fig. 12 is a plan view illustrating a modified form of the inflatable unit disposed for use as a bath;

Fig. 13 is a similar view showing the device of Fig. 12 disposed for use as a bed;

Fig. 14 is an end elevational view of the device as shown in Fig. 13;

Fig. 15 is a segmented sectional view taken at 15—15 of Fig. 14;

Fig. 16 is a somewhat enlarged segmented view, partly in section, of the device as shown in Fig. 14;

Fig. 17 is an end elevational view of the device as shown in Fig. 12;

Fig. 18 is a plan view illustrating another modification of the inflatable unit disposed for use as a bath;

Fig. 19 is a plan view illustrating another modification of said unit disposed for use as a bath;

Fig. 20 is a sectional view taken at 20—20 of Fig. 19;

Fig. 21 is a somewhat enlarged sectional view of a portion of the device shown in Fig. 20 showing a further modification;

Fig. 22 is a plan view of a further modification of said unit disposed for use as a bath;

Fig. 23 is a sectional view taken at 23—23 of Fig. 22;

Fig. 24 is a plan view of still a further modification of said unit disposed for use as a bed; and Fig. 25 is a somewhat enlarged segmental view, partly in section, showing further details of the structure shown in Fig. 24.

Referring more particularly to the drawings; the device comprises as its main elements inflatable element 1 (shown inflated in Fig. 6) and entirely enclosed within a casing member 2, which in the preferred embodiment illustrated also serves as a carrying case for infants' wearing apparel and accessories, as will be more particularly pointed out hereinafter.

The casing 2 is made of soft fabric or the like material and comprises an upper face 3 and a lower face 4 interconnected by a peripheral wall comprising the side walls 5—6, the top end wall 7 and the bottom end wall 8, as best seen in Fig. 3 where the device is in collapsed but extended position with the side walls 5 and 6 folded over the upper face 3 and the end walls 7 and 8 folded thereover. It is understood that the device as shown in Fig. 3 contains the inflatable unit 1 in deflated condition; a slit opening being provided at the juncture between the end wall 8 and the bottom face 4, for access to the inflating tube (shown at 52 in Figs. 7 and 10) of the member 1, and fastening means such as the snap fasteners 9 serving to releasably hold said slit closed. The lower face 4 is provided with suitably spaced loop tabs such as 10, 11, 12 and 13 (Figs. 1 and 2), made of fabric or the like tape for the purpose of pinning the device to a bed, chair, automobile cushion or the like; and the upper face 3 has secured thereto an adjustable belt 14 for holding the infant in position when the device is used as a mattress or the like.

The upper end 7 is provided with fastening element such as snap fasteners 15—16 disposed adjacent face 3 and the lower face is provided with a second set of fastening elements 17—18 (Fig. 3) so positioned that when the collapsed casing 2 and enclosed inflatable member 1 are folded about a transverse line spaced substantially one-third of the length of the device, the fastening elements 17—18 will be adjacent the fold line. A receptacle 19 in the shape of an envelope is provided with fastening elements 20—21 and 22—23 positioned to engage the first and second sets of fastening elements 15—16 and 17—18 when the parts are disposed as shown in Fig. 2; thus serving to hold the device in the partly folded position shown in Fig. 2. The receptacle 19 preferably comprises two oppositely disposed pocket compartments provided with respectively cooperating closure flaps 24—25 and the entire envelope is made of thin, resilient waterproof material, preferably polyvinyl chloride or the like. The upper end 7 (Figs. 2 and 3) carries secured thereto, adjacent its juncture with the lower face 4, a third set of fastener elements 26, 27 and 28 and the lower face 4 of the cover element carries a fourth set of fastening elements 29, 30 and 31 disposed substantially at the fold line and laterally spaced for cooperating engagement with the fastener elements 26, 27 and 28. It will thus be seen that when the upper section is folded over to the position shown in Figs. 1 and 1a the latter two sets of fastening elements serve to hold the device in folded position of a convenient size to be carried. The device as thus folded comprises outer folds A and B and an inner fold C (Fig. 1a) and the folds A and B are provided with strap loops 32—33 disposed adjacent the upper fold and together serving as a convenient carrying means for the device and such contents as may be placed in the receptacle 19. The device may be further reduced in size by rolling it either about a horizontal or vertical axis; and in Figs. 1b and 1c the device is shown as rolled about a vertical axis so as to provide a size convenient for carrying in a woman's handbag.

The inflatable element 1 will now be described with greater particularity with reference to Figs. 7–11, which show further details of a presently preferred form of this unit, which is made of relatively thin material impervious to both air and water and in the present embodiment is made from polyvinyl chloride or the like. Such material not only lends itself to ready fabrication, but is sufficiently soft and pliable for use with infants, may be readily washed and cleaned without damage, may be compactly folded, and furnishes substantial strength for relatively little weight.

This element comprises a body portion designated in general as 40 and a panel portion designated in general as 41. Since the unit 1 is devised to serve the dual purpose of a bed and a bath, each of the portions 40 and 41 are adapted to meet respectively dual conditions and to cooperate with each other in their respective functions. The body portion 40 provides a frame or support which pneumatically holds the panel 41 suspended, and in yieldable horizontal position when the device is used as a bed; and for this function the body must provide sufficient resistance in vertical compression and resistance against inward movement in a horizontal direction. When the device is used as a bath the body 40 functions as a side wall of a watertight receptacle and is therefore in watertight engagement with the panel 41 which serves as the bottom for said receptacle; and for this function the body must withstand outward resistance in a horizontal direction while maintaining its general shape and height. The panel portion in one position is adapted to hold an infant in correct posture and in the other position as the bottom of the aforementioned bath, in which function the pneumatic feature is desirable. The several characteristics and functions are conveniently met by the invention now to be described.

In the preferred embodiment (Figs. 7–11) the body portion 40 is formed of tubular sections such as the sides 42—43 and the ends 44—45, which are preferably substantially circular in cross-section and are secured together to provide, when inflated, a pneumatic body defining an encompassed elongated generally rectangular area and providing a continuous watertight side wall structure. In this embodiment the sections are in pneumatic communication with each other and are shown joined together so as to form a single air chamber; thus providing a convenience in fabrication and having excellent structural and pneumatic characteristics.

The panel 41, in the present embodiment, comprises an upper sheet element 46 and a lower sheet element 47 whose marginal edges are secured together in airtight sealed relationship to a corresponding peripheral zone of the body portion 40 adjacent the upper surface thereof along the line designated 48. A plurality of strips 49 are disposed between the top and bottom sheets 46—47, extending in substantially parallel longitudinal alignment and spaced apart in a transverse direction with the upper edges 49' of said strips being secured to the inner face of the upper sheet 46 and the lower edges 49'' of said strips being secured to the inner surface of the lower sheet 47. It will thus be seen that these strips provide partitions intermediate the upper and lower sheets 46—47. As will best be seen from Fig. 7 these partitions terminate in oppositely extending ends which are spaced inwardly from the ends of the panel 41 to thereby place the numerous cells intermediate these partitions in communication with each other at their respectively opposite ends. It will also be seen from Fig. 7 that the interior of the panel 41 is in communication with the interior of the tubular body portion 40, by means of an opening 50 (Figs. 7, 10 and 11). This openings is conveniently provided by sealing the lower sheet 47 to the adjacent wall of the tubular end 44 along an arcuate path 51 (Fig. 10) which joins the sealing seam 48.

A suitable inflating tube 52, provided with a valve 53, serves as a common means for simultaneously inflating both the body portion 40 and the panel portion 41. The panel portion 41 when inflated serves as a cushion which is supported from the body portion 40. The thickness of the pneumatic cushion panel 41 is substantially less than the thickness of the body portion 40 so that in the position shown in Fig. 8 the cushion panel is suspended along the top edge of the body 40 so as to span the space defined by the body. The longitudinal partitions 49 provide the desired condition of relatively greater transverse than longitudinal bending of the cushion panel, thus insuring excellent posture qualities. It has been found that the strength of the pneumatic cushion panel is materially improved by extending the partitions at 49 into the tapered ends of the cushion in such manner that the vertical extent of the partitions is greater at their ends than is the corresponding depth of the pneumatic panel. This serves to distribute the strain at this point and prevents the partitions from tearing away from the upper and lower sheets 46—47 at the extremities of the partitions.

The pneumatic panel 41 is one of the important features of the invention and has proven to be far superior to a single ply of material in properly supporting an infant suspended above the support on which the body 40 rests and in providing the desired softness while preserving correct posture. It is further noted that the device as shown in Figs. 4–6, when inflated somewhat loosely, may be readily bent in a longitudinal direction about its midpoint; so that with an infant attached by the strap 14 it may assume a sitting position and in such position the device when thus bent may be placed in a chair or the like and will retain the infant in this position without being held by an attendant. If desired a retaining strap (not shown) attachable and detachable by any suitable means may be provided for positively holding the device in bent position. The extreme lightness of the device will be appreciated when it is understood that devices of the present embodiment illustrated in Figs. 1–6, inclusive, weigh only about one pound.

In Fig. 9 the inflatable unit is shown positioned on a suitable support such as 54 with the cushion panel 41 inverted so as to rest on the support. In this position the peripheral body portion 40 serves as the side walls and the pneumatic panel 41 as the bottom wall of a receptacle to hold water 55 for bathing an infant; and the pneumatic panel 41 provides a resilient cushioned bottom.

As an example of the relative dimensions which have been found satisfactory it is noted that in the embodiment above described the pneumatic unit I when inflated is about 15½" x 30" in plan view; the body member is about 4" in diameter; the pneumatic bottom panel about 1½" overall thickness and is so disposed as to extend about ¾" outwardly beyond the adjacent side of the body member; thus providing, when used as a bath, a water receptacle approximately 7½" wide x 22" long x 3¼" deep.

The following embodiments of the invention serve to illustrate several modifications of the inflatable unit. While these embodiments are not at present considered to be as desirable as the preferred embodiment, all things considered, they embody in varying degrees the useful features of the invention. In each embodiment the unit is made of the same character of material as heretofore described with reference to the preferred embodiment.

In Figs. 12–17, inclusive, I have shown a modification in which two elongated tubular side members 60—61 carry secured thereto a pneumatic bottom panel 62 comprising longitudinally extending cells constructed and arranged in accordance with the preferred embodiment, except that in the present embodiment these cells and the bottom member 62 extend upwardly to provide end members 63—64 (Figs. 12 and 17). The sides and ends of the body are secured together in watertight relationship and the pneumatic envelope is completed by corner seals such as 56. It will thus be seen that the peripherally extending side wall comprises the side members 60—61 and the end sections 63 and 64. The inflatable section 60 is in communication with the end sections 63—64 by means of ports such as 65 and the end sections 63—64 are in communication with the opposite side section 61 by means of similar ports such as 66; it being understood that the respective cells of the sections 63 and 64 are in communication with each other at their outer ends in the manner previously described with respect to the preferred embodiment. The cells of the end sections are in communication with the corresponding cells of the bottom panel 62; it being noted that at the juncture between the bottom panel and end sections the sealing line such as 67 extends transversely of the cells to provide a line defining the juncture between the bottom and ends, and this sealing line is interrupted in each cell, as at 68 to thereby provide for the passage of air between the corresponding cells of the bottom and ends.

It will be seen from the foregoing that the side and end walls constitute a peripherally extending supporting body for the bottom 62 and that the parts are so disposed and arranged that when the bottom 62 is disposed lowermost, as in Figs. 12 and 17, a watertight receptacle is provided which is adapted to serve as an infant's bath; and that when the device is positioned with the bottom uppermost, as in Fig. 13, the device is adapted to serve as a bed for an infant. As in the preferred embodiment this unit is preferably made of polyvinyl chloride or the like material and is adapted to be inflated by a common tube and valve 69.

In Fig. 18 I have shown another modification in which two side members 70—71 and one end member 72 are constructed and arranged as in the preferred embodiment and the other end member is provided by means of an end panel 73 which is formed as a continuation of a bottom panel 74 in the manner previously described with respect to the parts 62 and 63 of the modification above described in connection with Figs. 12–17. The two sides 70—71 and the end 72 are sealed together by corner seals 76 so as to provide the watertight and airtight characteristics above described. In this embodiment a common inflating valve and tube is designated as 75 and is secured to and in communication with the end section 72. The side sections 70—71 are formed as continuations of the end 72, the bottom panel 74 is placed in communication with the end section 72 in exactly the same manner as previously described in connection with the preferred embodiment (Figs. 7 and 10), and the end section 73 is in communication with the bottom 74 in the manner above described with reference to the bottom and end 62 and 63 of Figs. 12 and 13.

A further modification is shown in Figs. 19—21 in which the two sides such as 80—81 and the end 82 and the bottom 83 are constructed and arranged in exactly the same manner as previously described in connection with Fig. 18. In this embodiment, however, the end 84 is somewhat differently constructed and arranged, as will now be more particularly described. As in the previous embodiments the bottom panel 83 is made of two sheets, here designated 85 and 86. The sheet 85 extends outwardly and upwardly to form an inner end wall member 87 (Fig. 20) and is then folded around at its upper end and is sealed together by a transverse seam 88 to form a horizontal tubular wall portion 89 and then extends downwardly to form an outer end wall 90. The lower sheet 86 of the bottom continues outwardly and is folded around to form a horizontal tubular wall portion 91. The contiguous portions are sealed together by a horizontal sealing seam 92 so as to close the ends of the cells between the sheets 85—86 of the bottom and to close the circumferential wall of the pneumatic portion 91. The ends of the pneumatic portions 91 and 89 are sealed to vertically extending end seams 93—94 which serve to close the tubular sides 80—81. Suitable inflation openings 95—96 are provided between the side 80 and the pneumatic end portions 89 and 91 as shown in Fig. 20. These openings may be conveniently provided in the same manner as previously described with reference to the opening 50 of the preferred embodiment (Fig. 10); and communication between the cells of the bottom and the end 82 is likewise similarly provided. In Fig. 21 I have shown a somewhat enlarged view of the lower horizontal pneumatic end portion 91 to illustrate how this portion, if desired, also may be placed in communication with the cells of the bottom panel by means of an opening 97.

In Figs. 22—23 I have shown a further modification of the inflatable unit. In this embodiment I employ tubular sides 100—101, similar to the side shown in Fig. 12; but instead of having a pneumatic bottom this device is provided with a plain sheet-like bottom 102 and from which the respectively opposite end walls are formed. The end walls are designated in general as 103—104 and since they are formed in the same identical manner it will suffice to describe the structural details of wall 103. The bottom 102 is folded over and provided with a horizontal seam 105 to form a horizontal tubular portion 106. The sheet is continued upwardly to form an end wall section 107 and is folded over at its upper end and sealed as at 108 to form a second horizontal tubular portion 109. The respective opposite ends of the tubular portions 106 and 108 are closed by being sealed to the end seams of the side members 100—101 as indicated respectively at 110 and 111; and the end wall section 107 intermediate the tubular sections 106 and 109 is sealed at its opposite ends at the sealed joints 110 and 111 to provide with the side walls watertight joints. The tubular horizontal portions 106 and 109 are placed in communication with the side member 100 by suitable openings 112 and 113. It will be understood that the end 104 of the body is constructed and arranged in the exact manner as above described with reference to the body end 103 and that the peripherally extending pneumatic portions of the body sides and ends may be inflated through a common valve tube 114; the air passing through the upper and lower end tubes into the opposite side 101.

In the embodiment shown in Figs. 24 and 25 the device comprises tubular side members 120—121 and a similar tubular end member 122 constructed and arranged as described in connection with Fig. 19. Likewise, the pneumatic bottom panel 123 is constructed and arranged identically as in the embodiment of Figs. 19—20. The only difference between the embodiment of Fig. 24 and the embodiment of Figs. 19—20 is that the two end wall sheets designated 87'—90' in Fig. 24 are secured together along horizontally spaced vertical lines 124 which extend from the lower edge of the tubular part 89' to the upper edge of the tubular part 91' to provide vertically extending inflatable cells which are suitably placed in communication with the upper tubular member 89'. This provision serves to stiffen the end wall in a vertical direction.

It will of course be obvious that in all of these modifications the unit is utilizable as a mattress when disposed so that the bottom is uppermost and is utilizable as a bath when it is disposed with the bottom lowermost—in the manner illustrated in Figs. 8 and 9 of the preferred embodiment.

Having thus described my invention with particularity with reference to the preferred form of the same and having shown and described certain modifications, it will be obvious to those skilled in the art, after understanding my invention, that various changes and other modifications may be made therein without departing from the spirit and scope of my invention, and I aim in the appended claims to cover such changes and modifications as are within the scope of the invention.

What I claim is:

1. A utility device for infants comprising an inflatable bed and bath unit, and a removable fabric or the like cover encasing said unit, said inflatable unit comprising a peripherally extending pneumatic body portion defining an encompassed area and providing a watertight wall, and a pneumatic cushion panel having a thickness less than the height of said wall and spanning said area, said panel having watertight continuity with a corresponding peripheral zone of said body portion adjacent one face thereof, whereby when said unit is disposed within said fabric casing with the panel uppermost a bed is provided and when said unit is removed from said casing and is disposed with said panel lowermost a bath is provided having a cushioned bottom, and said cover having a portion spanning said area and spaced from said panel.

2. A utility device for infants comprising an inflatable bed and bath unit, and a removable fabric or the like cover encasing said unit, said inflatable unit comprising a peripherally continuous pneumatic body of substantially circular cross-section defining an encompassed area and a pneumatic cushion panel spanning said area, said pneumatic cushion panel comprising inner and outer resilient sheets whose marginal edges are secured together and said panel being secured at its edges to and in watertight engagement with a corresponding peripheral zone of said body member adjacent one face thereof, said panel having longitudinally extending flexible strips spaced apart laterally with their respectively opposite edges secured to said inner and outer sheets and their ends freely spaced from the secured end edges of said sheets, said pneumatic cushion panel having its exterior surface extending outwardly beyond one exterior surface of said pneumatic body and its interior surface extending inwardly within said peripheral body and spaced a substantially greater distance from the opposite exterior surface of said body, whereby when said unit is disposed within said fabric casing with the panel uppermost a bed is provided and when said unit is removed from said casing and is disposed with said panel lowermost a bath is provided having a cushioned bottom, and said cover also having a panel portion spanning said area between points on said opposite surface of said body.

3. A utility device for infants comprising an elongated inflatable bed and bath unit, a cover and carrying case enclosing said unit, a receptacle for apparel, said cover and enclosed deflated unit being readily foldable into three folds one of which is disposed intermediate the other two, detachable fastening means jointly carried by said receptacle and cover for securing said parts together and thus holding said intermediate fold against one outer fold, fastening means for securing said outer folds together, and cooperating handles secured to said respective outer folds for carrying said device, said inflatable unit comprising a peripherally extending pneumatic body portion defining an encompassed area and a panel spanning said area and having its marginal edges secured to and in watertight engagement with a corresponding peripheral zone of said body portion, whereby when said unit is inflated and is disposed within said casing with the panel uppermost a bed is provided and when said unit is removed from said casing and is disposed with said panel lowermost a bath is provided, and said cover having a portion spanning said area and spaced from said panel when said unit is inflated.

4. A utility device for infants comprising an inflatable bed and bath unit, and a removable fabric or the like cover encasing said unit, said inflatable unit comprising a body member having pneumatic portions, and a pneumatic cushion panel member having a thickness less than the height of said body member, said panel member being secured in watertight relationship to said pneumatic portions and one of said members also forming a pneumatic wall extending between said pneumatic portions, said wall being secured in watertight relationship to said pneumatic portions to form with said body member a peripherally continuous, watertight wall extending around at least the major portion of said panel member and said panel member having watertight continuity with a corresponding peripheral zone of said peripheral wall adjacent one face of said body member, whereby when said unit is disposed within said fabric cover with the panel uppermost a bed is provided and when said unit is removed from said casing and disposed with said panel lowermost a bath is provided having a cushioned bottom, and said cover having a portion spanning the area within said peripheral wall and spaced from said panel member.

ABRAHAM N. SPANEL.

References Cited in the file of this patent

UNITED STATES PATENTS

| Number | Name | Date |
|---|---|---|
| 1,392,533 | Smyth | Oct. 4, 1921 |
| 1,576,211 | O'Kane | Mar. 9, 1926 |
| 1,738,411 | Welch | Dec. 3, 1929 |
| 1,944,466 | Rubin | Jan. 23, 1934 |
| 1,951,527 | Oas | Mar. 20, 1934 |
| 2,045,784 | Leve | June 30, 1936 |
| 2,216,818 | Kuhlman | Oct. 8, 1940 |
| 2,408,789 | Luisada | Oct. 8, 1946 |

FOREIGN PATENTS

| Number | Country | Date |
|---|---|---|
| 19,769 | Great Britain | Sept. 17, 1898 |